United States Patent
Rubin

(10) Patent No.: US 9,974,326 B2
(45) Date of Patent: May 22, 2018

(54) SCOOPABLE INSTANT PROTEIN BONE- OR MEAT-BASED PROTEIN SUPPLEMENT POWDER

(71) Applicant: Get Real Holdings, LLC, North Palm Beach, FL (US)

(72) Inventor: Jordan Seth Rubin, Koshkonong, MO (US)

(73) Assignee: Ancient Brands, LLC, North Palm Beach, FL (US)

( * ) Notice: Subject to any disclaimer, the term of this patent is extended or adjusted under 35 U.S.C. 154(b) by 0 days. days.

(21) Appl. No.: 15/462,321

(22) Filed: Mar. 17, 2017

(65) Prior Publication Data

US 2018/0000148 A1  Jan. 4, 2018

Related U.S. Application Data

(60) Provisional application No. 62/310,319, filed on Mar. 18, 2016, provisional application No. 62/352,233, filed on Jun. 20, 2016.

(51) Int. Cl.
| | | |
|---|---|---|
| *A23L 33/17* | (2016.01) | |
| *A23L 33/00* | (2016.01) | |
| *A23L 13/50* | (2016.01) | |
| *A23L 33/16* | (2016.01) | |

(52) U.S. Cl.
CPC ............... *A23L 33/17* (2016.08); *A23L 13/52* (2016.08); *A23L 33/16* (2016.08); *A23L 33/30* (2016.08); *A23V 2002/00* (2013.01)

(58) Field of Classification Search
CPC .......... A23L 33/16; A23L 33/17; A23L 33/30; A23L 13/52; A23V 2002/00
See application file for complete search history.

(56) References Cited

U.S. PATENT DOCUMENTS

2017/0143019 A1* 5/2017 Robertson ............... A23L 13/70
2017/0156388 A1* 6/2017 Gallardo ................. A23L 33/40

* cited by examiner

*Primary Examiner* — Hoa V Le
(74) *Attorney, Agent, or Firm* — Barbara E. Johnson, Esq.

(57) ABSTRACT

The present invention is an instant (agglomerated particle) scoopable protein food supplement powder composition containing at least 70%, more preferably 80%, and most preferably 85-90% animal protein or molecules derived therefrom, carbohydrate less than 10% and preferably undetectable, sodium less than 5% and preferably less than 200 mg per serving, ideally approximately 150 mg per serving. The powder is preferably in the particle size range of about 30-100 mesh, more preferably about 40-80 mesh.

10 Claims, No Drawings

SCOOPABLE INSTANT PROTEIN BONE- OR MEAT-BASED PROTEIN SUPPLEMENT POWDER

FIELD OF THE INVENTION

The invention pertains to nutritional supplement instant protein powders that are suitable for direct addition to end-user products including foods and beverages, without needing any further cooking or other preparation, or likewise for inclusion in manufactured functional foods, snacks and beverages. These powders are a completely different, and wonderfully palatable, alternative to whey, soy, pea, rice or egg white instant protein powders—and they provide animal protein (and other nutrients and beneficial compounds found in chicken soup and meaty or bone soups and broths) in this scoopable powdered form for the first time.

BACKGROUND OF THE INVENTION

We do still live in a hot soup world, when it comes to nutrition—or at least we want to. Citations to the importance of soup in the diet include, without limitation by any means, Chaloner, Jack, "How Soup Can Help You Lose Weight," *BBC News Magazine,* 26 May 2009; and Zhu, Yong et al., "Soup consumption is associated with a lower dietary energy density and a better diet quality in US adults," *British Journal of Nutrition,* vol. 111 no. 08, April 2014, pp. 1474-1480, just to name two. Few if any countries or cultures do not have a central, signature hot soup as an essential element of the local cuisine. Many restaurants in the United States will answer their morning telephone calls with a bold report of the "soup of the day" instead of a more standard greeting. A gift of hot, homemade soup is the gold standard gift for any sickroom visit, and "chicken soup" as a concept appears in print far beyond recipes to the point that allusions to it in wellness publications, self-help literature and serious works of philosophy are extensive and beloved. One need not consult a former Campbell's (brand) advertising campaign to know that—soup is good food.

Notwithstanding the extraordinary popularity—and ubiquity—of soup, daily soup making in the kitchen is a challenge for anyone. Although there are some labor saving tools available to the commercial kitchen and, to a lesser degree, to the home cook, basic stock preparations have not changed much if at all since earliest culinary histories were recorded. Even with increased pressure equipment and cleverly processed additives, soup making still takes time—lots of it. In the day-in-day-out milieu of our lives, therefore, we tend not to make much daily homemade soup in our own kitchens and, except for a working lunch at one's desk, we tend to eat soup less than our parents and grandparents did (with the exception of the occasional, leisurely meal or special occasion). Soup not only takes time to prepare, it takes time to cool and time to consume. Accordingly, for students, or people who work outside the home, or people who work in the home, and therefore basically everyone, our on-the-run events that tend away from soup include breakfast, getting ready for work or school, after school arts or sports programs, after work social or business occasions squeezed into the day between work and evening or family obligations; overnight infant or child care, adult or elder nursing or occupational care, and the list goes on and on. During these times nutritional intake customs are generally somewhat to extremely informal for many or most of us. These customary menu items are well known and include cold, room temperature or quickly reheatable foods such as sandwiches, protein bars, fruit or vegetable smoothies, salads, (mainly leftover) soup, and of course the common American meal substitute menu items such as pizza and burgers, cheese with crackers, raw vegetables, canned, frozen or dehydrated convenience foods and so forth. For those who work consistently to improve their dietary intakes to reduce sodium and fat and to moderate calories relative to nutrients, fiber and protein, a common goal is to emphasize raw fruits and vegetables and their prepared counterparts, namely fruit- or vegetable-containing porridges such as oatmeal, salads, and blender beverages and smoothies, in favor of other higher fat or higher salt possibilities. "Just-made-now" homemade or restaurant soup has therefore not often been practical to include on this list of at-hand healthy foods, due to the time element alone.

A need therefore remains for a paradigm-shifting invention that makes it possible for us easily to consume the nutritional equivalent of just-made soup, when we have no time for traditional soup-making or consumption, ideally while consuming other essential nutrients directly from the fruit and vegetable and maybe also grain, dairy and other nutritive sources that we all try to emphasize in a healthy daily diet. If possible, the answer to such a need would be a product that requires no further cooking or preparation, has superlative shelf stability, and is versatile enough to combine with virtually any other menu offering of food, beverage or nutritional supplement. In the best of all possible worlds, such a paradigm changing invention would be extremely high in protein without being gritty or otherwise unpleasant to the palate.

SUMMARY OF THE INVENTION

In order to meet this need, the present invention is an instant (agglomerated particle) scoopable protein food supplement powder composition containing at least 70%, more preferably 80%, and most preferably 85-90% animal protein or molecules derived therefrom, carbohydrate less than 10% and preferably undetectable, sodium less than 5% and preferably less than 200 mg per serving, ideally approximately 150 mg per serving. The powder is preferably in the particle size range of about 30-100 mesh, more preferably about 40-80 mesh. In the most preferred embodiment of the invention, the protein powder contains 88.1% animal protein (chiefly collagen, peptides or amino acids derived therefrom, and glycosaminoglycans including without limitation glucosamine, hyaluronic acid and chondroitin) and the serving size is 22.5 grams, yielding 20 grams of protein and about 90 calories per 22.5 gram serving. The animal protein is a spray dried, agglomerated protein water extract of culinary one of two starting materials: meaty-muscle-containing animals (sometimes referred to as "meaty broth," although in this instance "not just any meaty broth") including but not limited to chicken, turkey, beef, lamb, goat, quail and all sorts of large and small game mammals and birds (but typically and preferably chicken or a mixture of chicken, beef and turkey; or bone-broth extractions generally from the aforementioned list of farm or wild animals in which the presence of a significant portion of bone in the bone-broth making starting ingredients is important. As with all competent culinary extractions from bone-containing or meaty-muscle containing culinary animals, the raw materials for the extraction include not only relevant osseous or meaty fractions themselves (including what is culinarily called the marrow, when the osseous fraction is present) but also the associated proteinaceous structures such as tendons, ligaments, fascia and adequate adjacent muscle tissue to provide enough protein such that the extraction liquid, when dried and powdered, contains the desired high protein or protein derivative content. In other words, when the starting extraction for the present scoopable powders is a bone broth recipe, adequate marrow and tendons, ligaments, fascia and muscle are present to achieve the required high protein content in the bone broth thus produced. When a meaty broth protein is made prior to further processing to a scoopable powder, as long as adequate muscle is present the bones and connective tissues may be reduced or absent from the aqueous extraction. The protein powder of the present invention will always have been processed, prior to use, to an instant (agglomerated) scoopable powder for inclusion as-is as a nutritional supplement, in protein bars, beverages and foods such as oatmeal, fruit or vegetable juices and smoothies, granola or hot or cold beverages and requires no further cooking prior to consumption. The scoopable powder may also be included during manufacture of functional foods, nutritional supplements, functional beverages or other supplement or meal-replacement comestibles, to increase the animal protein fraction of the end product. The present protein powder is not an instant soup and does not taste like one when reconstituted by itself in water alone (primarily due to there having been no added salt at all during processing), although the taste is not unpleasant. As one aspect to the ingenuity of the present protein powder, with its specified mesh particle sizes, the powder is extremely versatile: it will quickly dissolve or suspend in cold or hot liquids but is equally palatable as a dried powder per se, so it can be included in all sorts of end-user or manufactured products regardless of whether the mostly-protein particles will dissolve or rehydrate. For example, the present powders can be included in dry products that are consumed directly—including but not limited to popcorn coatings, granola-type or cold-cereal based sweet or savory snack mixes, potato chips, cookie or food bar coatings, and the like. The present protein powders can also be included in products that are not quite either liquid or solid, such as chewing gum, gummy bears and other soft candies, frozen desserts, cake frostings, mayonnaise and salad dressings or other condiments, applesauce or food purees and so forth. The possibilities for protein enhancement in the salty snack industry alone are staggering—any consumer would be delighted to look at the nutritional information for, say, a portion size of spice-and-protein coated pretzels to learn that the serving provides, for example, 5 g of protein, given that salty snacks often provide little or no protein at all. By using the present scoopable protein powder, any consumer at any time can add a scoop of protein, to any comestible, which contains not only desirable collagen, peptides, proteins and glycosaminoglycans, but also the equivalent of a just-made-soup's other nutritive potassium and calcium, without any kitchen time, cooking or clean up.

The protein powders of the present invention may be "plain," or can be flavored such as with chocolate or vanilla (or other flavorings) and sweetened if desired preferably with natural sweeteners sourced from monk fruit, stevia, coconut sugar or a sugar alcohol such as xylitol. Because the present protein powders can substitute for whey, soy, rice, pea, hemp or egg white protein in any food or oral administration context, the powders can be co-formulated with virtually any additional nutrient or supplement. Because the present extract based powders derived from animal meaty-muscle or bones with or without connective tissue are a good source of potassium, the reconstituted powder (in cold or hot water) can make an excellent electrolyte beverage by itself or in combination with other ingredients such as juices, meaning that the present invention is particularly well suited for co-formulation with other juice powders, or powdered coffee or cacao or tea or any other botanical based or culinary drink ingredients, as instant beverage mix products. Also, because the present powders are high in glucosamine and chondroitin, they are particularly well suited for co-formulation with turmeric, with or without organic coconut oil or coconut milk, as a medicament to treat or to prevent joint damage. Indeed, with the endless possibility of combinations, the present powders find good application in animal or pet nutrition for immune, gut, joint health and beautiful coat maintenance; muscle building for animals and humans when combined with healthy fats such as those available in coconut milk; fat burning and satiety preparations for humans when combined with high fiber ingredients or thermogenic herbs; and beauty or antiaging applications when combined with skin supporting botanicals known in the art.

DETAILED DESCRIPTION OF THE INVENTION

With the notable exception of wholesale frozen soups for restaurants, the history of soup preservation in the United States includes certain disappointing chapters. Bouillon cubes and bouillon powders are not intrinsically terrible products but do contain, at least typically, huge amounts of sodium—sometimes more sodium in one serving than an individual intends to include in the entire day's intake. The contents and palatability of individual canned and frozen, and dehydrated, soups intended for consumers have made great progress over the last few decades but, again, most if not all of these are plagued by high sodium content and often also high and unwanted fat and carbohydrate contents. Even good pre-prepared soups require either reconstitution or reheating more elaborate than simply stirring them into water. There simply has not been, nor even any thought of providing, a consumer level instant product that really matches the key ingredients profile of a high quality home-made or chef made soup, in a scoopable, easily dissolved or suspended instant powder that can also be consumed without reconstitution at all.

After one knows about the present invention and has experienced its ease of use and superlative benefits, it is difficult to recall a world where it did not exist before—and where no one even thought about such a product or what a consumer boon it could be. By happenstance, the scoopable, instant powders of the present invention do have some antecedents in the worlds of meaty broth or bone broth of the prior art, in the sense that powdered bone broth and meaty broth were not unknown prior to the present invention. However, both the present meaty broth powder and bone broth powder are highly specialized, scoopable products with intensive, critical nutritional parameters, and are thus distinguishable from generic broth powders of the prior art. After all, both bone broth and meaty broth, in ordinary parlance, and prior to the present invention, referred to a massive genre of water extracts of culinary meat or bone broth recipes—with little requirement as to how to qualify for the category. However, the present powders are highly engineered compared to any sort of more general meaty broth powder or bone broth powder, particularly as to required high protein content, low salt and fat and not only particle size range limitations but also the specifically "instantized" character of the particles created by spray drying and (critically) agglomeration to an engineered size range. Moreover, the present invention includes the ingenious use of such powders as described as a scoopable instant protein supplement for end-use consumption without further processing, or the use of such powder or powders in further manufacturing of foods and beverages of all kinds, and particularly functional foods and beverages that are designed for a high protein profile while still containing limited salt, fat and carbohydrate. The present invention therefore does not pretend to be the first instance of spray dried extracts of culinary meaty broths or bone broths by any means. Instead, the present invention claims to be the first of such instant, agglomerated powder products with specified parameters, including high protein and specified particle size, so as to provide widespread end-user and manufacturing applicability due to its technical features and its ability to be consumed even as is, with or without any sort of reconstitution. If one strays from the constituents and limits of the present invention as described herein and set forth in the associated claims, one will be back in the vast and varied world of dried instant soups and bouillon products that do not have the versatility of the present invention, namely, an end-consumer scoopable instant protein supplement or a high protein nutritive additive for functional foods and beverages that is palatable enough to be consumed even without reconstitution—while simultaneously being perfect for mixing into or onto virtually anything else in any menu tradition.

As one might expect from the above explanation, the present invention is therefore by no means simply one of a variety of meaty or bone broth extracts that has been subsequently converted to a powder. The most preferred embodiment of the invention is set forth in Example 1, but the importance of the invention is in knowing the end-product parameters that have been designed herein, in terms of protein, fat, salt and carbohydrate content as well as particle size and particle size distribution. These parameters constrain the product as follows: at least 70%, more preferably 80%, and most preferably 85-90% animal protein including collagen, peptides and amino acids derived from collagen, and glycosaminoglycans including glucosamine, chondroitin and hyaluronic acid, carbohydrate less than 10% and preferably undetectable, sodium less than 5% and preferably less than 200 mg per serving, ideally 150 mg per serving, with particle mesh size of agglomerated particles' being about 30-100 mesh, more preferably 40-80 mesh. In the most preferred embodiment of the invention, every 100 grams of powder product will contain (only and approximately) 600 mg sodium, or only on the order of about 150 mg sodium per 22.5 g serving, as well as 1,000 mg potassium per 100 g powder and approximately 60 mg calcium per 100 g powder. The inventor believes that the combined features of at least 70% protein and a particle size between 30-100 mesh, preferably 40-80 mesh, gives the new and unexpectedly improved result of both high protein content with a palatable (and even silky) mouth feel even if the particles are not reconstituted in water or any sort of liquid prior to consumption. No other end-use, consumer protein powder known to the inventor at this writing can pretend to have these combined features as a protein powder supplement or high protein ingredient in a functional food or beverage. Happily, also, the present protein powders are free of common allergens that can be found in whey, milk, egg or soy protein and are in fact free of the top eight common allergens.

While it is true that the present invention is a highly technical iteration of a huge category sometimes known to contain either meaty broth or bone broth, from which category one could not have selected the present invention without having first read this patent specification, there are indeed already known benefits of meaty broth that therefore do obtain with the present invention. For example, both meaty broth and bone broth are known to restore a "leaky gut," because the gelatin and collagen in both types of broth protect and heal the gastrointestinal mucosa, particularly due to the presence of the amino acid 1-glutamine as the main amino acid that the cells of the gastrointestinal lining use to repair themselves. The consumer can therefore, in turn, overcome food intolerances and allergies when a "leaky gut" is restored with meaty broth or bone broth constituents, because such intolerances and allergies are largely caused by undigested large food particles' seeping out of a leaky gut and triggering an immune response. More generally, also, both meaty broth and bone broth are well recognized for their abilities to reduce the symptoms (and even duration) of cold or flu as well as joint pain and inflammation, largely due to suppression of white blood cells and the presence of glucosamine which stimulates the growth of new collagen. The collagen and gelatin in both meaty broth and bone broth promote healthy skin, hair, and nails; minerals in both types of broth, including calcium, magnesium and phosphorus, promote good bone health and repair, and consuming collagen-rich meaty or bone broth can even reduce cellulite and tighten and beautify the skin, making the consumer look younger than actual chronologic age. It is no wonder that all those aforementioned literature and even popular references to the benefits of chicken soup (meaty broth, bone broth, and so forth) are so widespread. Given all these benefits, the stunning possibilities and versatility of the present scoopable, instant protein supplement powders are readily evident.

The present powders are always agglomerated. Agglomeration technology has been well known for decades and is well within the skill of the art. Agglomeration is what helps to make the present powders instant, meaning that the user may consume the powder as is or partially or completely reconstituted in one or more liquids but without necessity of further heating, cooking or other preparation.

While the starting bone broth and meaty broth materials discussed above have many similarities, they have distinctions also. Example 1, below, describes a method of making a bone broth and bone broth powder, whereas Example 2 describes making a meaty broth powder. As with bone broth, meaty broth can be extracted from any of chicken, turkey, beef, lamb, goat, quail, and all sorts of large and small game mammals and birds (but typically and preferably chicken or a mix of chicken, beef and turkey). Meaty broth is an extract of solely or predominantly muscle tissue, generally with reduced or little presence of bones, or connective tissue such as tendons, in the starting ingredients for making the broth. Either the bone broth powder or the meaty broth powder will preferably contain 85-90% protein, but interestingly bone broth powder prepared according to the present invention will often contain about 88% protein whereas meaty broth protein will often contain about 86% protein. This may seem counterintuitive at first, but with sophisticated understanding one appreciates that the bones—with bone marrow and collagenous connective tissue included in the aqueous extraction—can be seen as a rich source of collagenous and glycosaminoglycan proteins that are not derivable from the starting ingredients of meaty broth. More easily predictable, of course, is that the content of certain minerals, particularly calcium and magnesium, in meaty broth is almost always lower than in bone broth, for the obvious reason that no bones are present from which calcium or magnesium might otherwise be extracted. More particularly, whereas bone broth powder may typically have 95 mg of calcium per 100 gm of powder, meaty broth will have about 60 mg per 100 grams of powder. Bone broth powder prepared according to the invention will typically have 670 mg sodium and 1200 mg potassium per 100 grams of powder, whereas meaty broth powder prepared according to the invention will typically have 1290 mg sodium and 3020 mg potassium per 100 grams of powder—meaning that the meaty broth provides about 320 mg of sodium per 22.5 g. serving. Also, whereas the bone broth powder will typically have no discernible dietary fiber content, meaty broth powder will typically have 1 gram of dietary fiber per 100 grams of powder. While these differences may seem subtle at first glance, in fact the slightly higher sodium and slightly lower calcium content of meaty broth powder together mean that the meaty broth powder is even more gentle to compromised gastrointestinal linings than the bone broth is—meaning that meaty broth is even better able to stop a leaky gut (as described above) than bone broth is, when the calcium and magnesium content in the meaty broth is relatively lower than in the bone broth. The benefit of meaty broth powder is probably also enhanced by the typically higher content of Vitamin A—about 100 international units per 100 grams of meaty broth powder—than in bone broth powder, in which vitamin A is negligible to none. Finally, the fat content of typical bone broth powder is about 3.3%, attributable to fats derived from bone marrow, whereas the fat content of meaty broth powder is typically 2%, which is another reason why meaty broth is even better for compromised gastrointestinal mucosa than bone broth (powder) is (less fat means less difficulty of digestion). For leaky gut and other related indications, as a matter of nutritional supplementation the preferred order of introduction is therefore to supplement meaty broth powder to any given patient or individual, first, and then to graduate to bone broth powder if both are available and this sequence of administration is tenable. When meaty broth powder is not available, bone broth powder is still an excellent choice for the treatment of leaky gut, with meaty broth powder providing some slight benefits over bone broth powder, but with either's being better than virtually any other nutritional supplement. It is useful to know that in Asia, it is common for very fragile persons, including the very young, the very old and those recuperating in hospital, to consume meaty broth instead of bone broth—for reasons along the lines of those described above. The higher vitamin A and sodium and potassium content of meaty broth, with concomitantly lower fat and calcium, all provide a nutrient profile that is as gentle on the gut as is possible.

Those skilled in the art will be able to extrapolate from the examples given herein, to convert a manufacturing protocol which set forth chicken connective tissue and chicken meat, to accommodate other culinary animals and their soup meaty bones/connective tissue and muscle ingredients. Therefore, the following examples are illustrative but not limiting.

EXAMPLE 1

Beginning with chicken ingredients that have not been genetically engineered, an aqueous extract is made of USDA inspected and labelled fresh, raw chicken bones with approximately 25% by weight (based on the weight of the bones) associated connective and muscle tissues by cooking the bones and connective tissues in water at 212 degrees F. or higher for a minimum of thirty minutes, at elevated pressure if desired. Counterintuitively, to the aqueous cooking mixture is added no other ingredient and no salt. Subsequent to cooking, the fat fraction of the liquid is removed from the surface of the extract by skimming or gravity separation and reserved for a separate application. The defatted liquid is then concentrated, filtered through a 300 micron screen, spray dried and agglomerated, and the resulting powder is sifted through a 2000 micron screen. After passing the resulting powder through the field of a rare earth magnet, the powder is packed in hermetically sealed plastic bag packaging. Due to the high content of connective and muscle tissue relative to bone weight and the deliberate fat separation, the resulting protein powder contains 88.1% protein, less than 4% fat, a maximum of 8% moisture, total broth solids of 90%, 670 mg sodium per 100 g of powder, 1,200 mg potassium per 100 g of powder, 60 mg calcium per 100 g of powder, and undetectable amounts of carbohydrate or sugar, or cholesterol or fiber.

EXAMPLE 2

Beginning with chicken ingredients that have not been genetically engineered, an aqueous extract is made of USDA inspected and labelled fresh, raw chicken muscle tissues (minimal to no bones or connective tissues) by cooking the muscle tissues in water at 212 degrees F. or higher for 5 to 20 minutes, at elevated pressure if desired. To the aqueous cooking mixture is added no other ingredients and no salt. Subsequent to cooking, the fat fraction of the liquid is removed from the surface of the extract by skimming or gravity separation and reserved for a separate application. The defatted liquid is then concentrated, filtered through a 300 micron screen, spray dried and agglomerated, and the resulting powder is sifted through a 2000 micro screen. After passing the resulting powder through the field of a rare earth magnet, the powder is packed in hermetically sealed plastic bag packaging. The resulting protein powder contains 86.1% protein, about 2.0% fat, a maximum of 8% moisture, total broth solids of 90%, 1290 mg sodium per 100 g of powder, 3020 mg potassium per 100 g of powder, 95 mg calcium per 100 g of powder, 100 international units of vitamin A per 100 g of powder, about 1 g dietary fiber per 100 g of powder, and undetectable amounts of carbohydrate or sugar, or cholesterol.

Although the invention has been described with particularity in the foregoing paragraphs and pages, with reference to particular specific ingredients and amounts, the invention is only to be limited insofar is set forth in the accompanying claims.

I claim:

1. A scoopable, instant agglomerated protein powder for direct consumer consumption containing at least 70% animal protein, no added salt, and further having agglomerated particles in a size range between 30-100 mesh.

2. The scoopable, instant agglomerated protein powder of claim 1 wherein said powder is made of individual particles and said particles have a size range between 40-80 mesh.

3. The scoopable, instant agglomerated protein powder of claim 1 wherein said powder is plain or flavored as chocolate, vanilla, or turmeric.

4. The scoopable, instant agglomerated protein powder of claim 1 wherein said powder further contains potassium and calcium.

5. The scoopable, instant agglomerated protein powder of claim 1 wherein said powder has a maximum moisture content of 8%.

6. The scoopable, instant agglomerated protein powder of claim 1, wherein said powder is a spray dried, agglomerated powder created from an extract primarily of animal muscle.

7. The scoopable, instant agglomerated protein powder of claim 1, wherein said animal protein derives from both animal muscle tissue and animal bones.

8. The scoopable, instant agglomerated protein powder of claim 1, wherein said animal protein is derived from chicken.

9. A method of supplementing an animal or human diet in need of such supplementation by administering, in unit dosage form, one or more doses of the protein powder set forth in claim 1.

10. A method of supplementing the nutritional content in a functional food or beverage by including, in the manufacturing thereof, a portion of the protein powder set forth in claim 1.

* * * * *